United States Patent [19]

Howard et al.

[11] 3,916,584

[45] Nov. 4, 1975

[54] SPHEROIDAL COMPOSITE PARTICLE AND METHOD OF MAKING

[75] Inventors: Robert N. Howard, Stillwater; Harold G. Sowman, Maplewood, both of Minn.

[73] Assignee: Minnesota Mining and Manufacturing Company, St. Paul, Minn.

[22] Filed: Mar. 22, 1973

[21] Appl. No.: 343,701

[52] U.S. Cl. .................. 51/308; 51/295; 51/309
[51] Int. Cl.² .................. B24B 1/00; C09K 3/14
[58] Field of Search .......... 51/309, 295, 308, 307

[56] References Cited
UNITED STATES PATENTS

| | | | |
|---|---|---|---|
| 2,261,639 | 11/1941 | Benner et al. | 51/309 |
| 2,360,841 | 10/1944 | Baumann et al. | 51/309 |
| 2,471,132 | 5/1949 | Wickman | 51/309 |
| 2,796,338 | 6/1957 | Haberl | 51/309 |
| 2,849,305 | 8/1958 | Frost | 51/309 |
| 3,239,321 | 3/1966 | Blainey et al. | 51/309 |
| 3,266,878 | 8/1966 | Timmer et al. | 51/298 |
| 3,372,010 | 3/1968 | Parsons | 51/309 |
| 3,454,385 | 7/1969 | Amero | 51/309 |
| 3,486,706 | 12/1969 | Weyand | 51/309 |
| 3,702,758 | 11/1972 | Fukui et al. | 51/309 |

*Primary Examiner*—Donald J. Arnold
*Attorney, Agent, or Firm*—Alexander, Sell, Steldt & DeLaHunt

[57] ABSTRACT

Composite abrasive granules, in which fine, hard abrasive grains are distributed throughout a relatively softer metal oxide matrix, can be substituted for conventional abrasive grains. In a preferred method of manufacture, the abrasive grains are dispersed in a metal oxide gel, the gel dehydrated to leave spheroidal composite granules, and the granules heated to drive off the remaining water. The temperature of heating is low enough that temperature-unstable abrasive grains, like diamonds and cubic boron nitride, can be used.

16 Claims, 1 Drawing Figure

U.S. Patent  Nov. 4, 1975  3,916,584
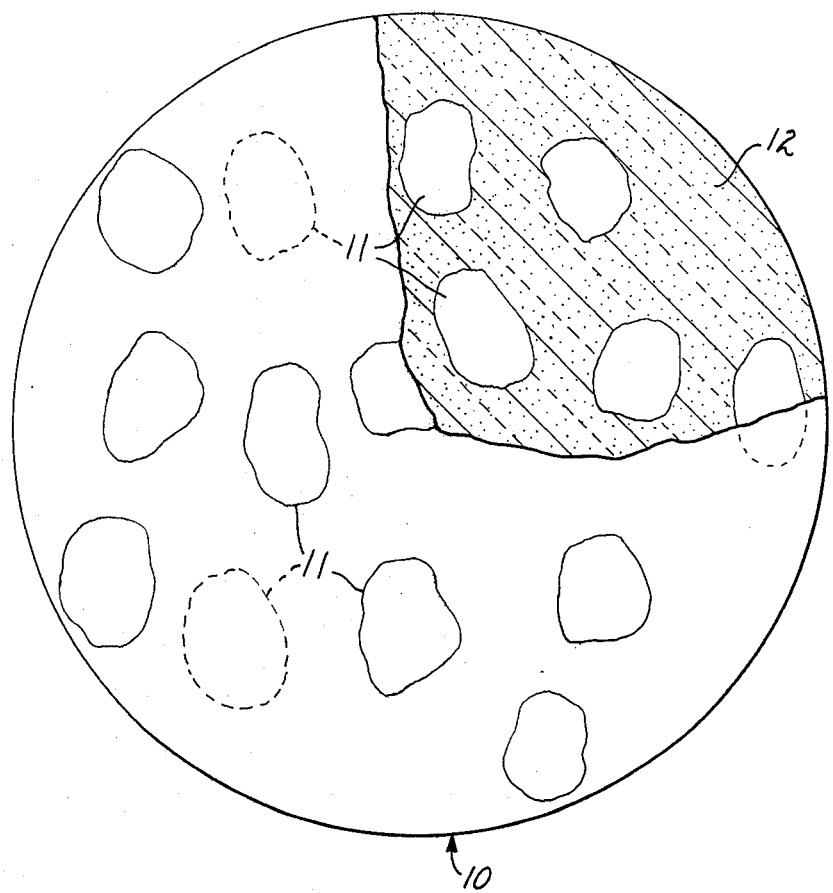

SPHEROIDAL COMPOSITE PARTICLE AND METHOD OF MAKING

BACKGROUND OF THE INVENTION

This invention relates to composite abrasive granules, to methods of their manufacture, and to products made therewith.

Effective utilization of extremely fine abrasive granules has always posed a problem to manufacturers of coated abrasive products. Many such particles are too fine to coat directly on a backing and hence must either be discarded or remelted and recrushed. One solution has been to disperse the particles in a softer, lower-melting inorganic material to form composite granules; see, e.g., U.S. Pat. No. 2,849,305, in which titanium carbide grains are dispersed in fused aluminatitania and the resultant composite cooled and crushed. Similarly, U.S. Pat. No. 2,358,313 discloses fine aluminum oxide particles dispersed in a softer matrix of vitrified garnet, and U.S. Pat. No. 3,156,545 teaches the preparation of composites in which zirconia abrasive grains are dispersed in a glassy matrix. Generally speaking, the matrices in each case are prepared by heating to high temperatures, on the order of 1200° – 1600°C. Although these techniques are all useful, they all suffer from limiting disadvantages.

One difficulty in prior art techniques for the manufacture of composite abrasive granules is the fact that certain abrasive grains—notably diamonds and cubic boron nitride which are not only very hard but also very expensive—are temperature-unstable. When heated to the temperatures required to prepare a vitreous matrix, e.g. 1200° – 1600°C., the crystal structure of such grains tends to convert to the non-abrasive hexagonal form, destroying their utility.

Diamond and cubic boron nitride grains have been dispersed in organic resins and polymers, e.g., epoxy resins, but the resultant composite granules are not as strong as desired.

Another problem that has been universally encountered is an inability to prepare extremely small (e.g., diameter of 500 microns or less) wholly inorganic spherical composite granules containing dispersed abrasive grains. Such spheroids, if they could be prepared, would lend themselves to the preparation of extremely uniform coated abrasive products. Prior to the present invention, small composite granules of this type did not exist.

BRIEF SUMMARY OF THE INVENTION

The present invention provides novel wholly inorganic composite abrasive granules which are simple to manufacture and which can utilize such thermally unstable abrasive grains as diamonds and cubic boron nitride. The granules can be made substantially spheroidal and of extremely small diameter, e.g., 10 – 200 microns.

In accordance with the invention, fine, hard abrasive grains are distributed uniformly throughout a matrix of softer microporous metal oxide (e.g., silica, alumina, titania, or zirconia) or mixtures such as alumina-boria-silica, zirconia-silica or others. In a preferred method of manufacture, the abrasive particles are mixed into an aqueous sol of a metal oxide (or oxide precursor) and the resultant slurry in turn added to an agitated dehydrating liquid such as 2-ethyl-1-hexanol. Water is removed from the dispersed slurry and surface tension draws the slurry into spheroidal composites, which are thereafter filtered out, dried, and fired at temperatures sufficiently high to drive off the balance of the water, volatilize and decompose fugitive material and calcine the matrix material to a firm, continuous, microporous state, but insufficiently high to cause vitrification, or fusion. As a result, the matrix retains a degree of microporosity, as can be detected by the disappearance of the matrix when filled with an oil having the same refractive index as the matrix and viewed with an optical microscope. This oil-absorbing feature of the matrix permits the incorporation of lubricants, liquid grinding aids, etc., to enhance performance of the composite in actual abrading operations.

As previously indicated, the matrix of the composite granule is softer than the abrasive grains. Generally speaking, the hardness of the matrix will not exceed 1000 Knoop and the hardness of the abrasive grain will be at least 1500 Knoop.

The abrasive granule of this invention overcomes the prior art deficiencies and provides a method for utilizing very fine abrasive grains, even thermally degradable grains, on the order of one-half micron or smaller, in a porous metal oxide matrix. The large abrasive granules do not become embedded in a carrier substrate, e.g. film or fiber, as do small abrasive grains.

The abrasive grains dispersed will range in size from sub-micron, i.e., one-half micron or less, up to 25 microns in diameter. Generally speaking, the abrasive grains will have a diameter of less than about 25 microns; grains larger than 25 microns may cause cracking of the matrix material. Also the abrasive grains above 25 microns can be coated on abrasive articles to form useful materials. The most preferred abrasive grains are those having a nominal diameter of 15 microns or less since these finer abrasives are the more difficult to use in abrasive articles such as coated abrasives and benefit the most from being part of a larger abrasive granule.

The abrasive grains used may include well-known abrasive grains such as silicon carbide, aluminum oxide, boron carbide, as well as other abrasive grains and mixtures thereof. The abrasive granules of this invention are particularly suited for use with the thermally degradable abrasive grains such as diamond or cubic boron nitride.

Compared to the original component abrasive grains or particles the fired abrasive composites are large granules, generally spherical in shape, ranging from less than 5 microns to 200 microns and more in diameter. The smaller composite granules are suitable for use with the smaller abrasive grains, e.g., 0.5 – 5 microns, although the finer abrasive grains may also be used in the larger diameter composite materials. However, in all cases the composite granule will be at least twice the size of the abrasive grain so that a plurality of abrasive grains are generally present in the abrasive composite. The abrasive composites will normally be spherical in shape and this is the preferred shape because spherical granules are easy to handle. However, other shapes such as ellipsoid or irregularly shaped rounded granules also provide satisfactory granules.

The colloidal sols or solutions used in the practice of this invention contain a metal oxide or compounds calcinable to a metal oxide. Examples of suitable solutions or sols are those which contain or are sources of zirconia, silica, zirconia-silica, alumina, magnesia, alumina-silica, alumina and boria, titania, or mixtures thereof.

The aqueous sols or solutions as prepared may be relatively dilute, generally containing the equivalent of about 10 to 40 weight percent equivalent metal oxide solids. Silicon and boron possess characteristics which are both metallic and nonmetallic in nature. Their oxides perform in this invention the same as well accepted metal oxides, e.g. titania, alumina. Therefore, for the purposes of this disclosure silica and boria are considered metal oxides.

The abrasive grains or abrasives used are uniformly mixed into the sol of the metal oxide or metal oxide precursors to form a slurry. The abrasive grains are generally dispersed in a water suspension prior to mixing and generally remain dispersed, but where necessary alcohol, e.g. ethanol or methanol, or other organic dispersing agents, wetting agents or surfactants may be added to the abrasive dispersion to insure uniform mixing of the abrasive grains and the sol.

The slurry is placed, e.g. by pouring or injecting, into an agitated drying liquid to form rounded granules and dehydratively gel the rounded granules forming green abrasive composite granules. Preferred drying media and partially water-miscible alcohols, e.g. 2-ethyl-1-hexanol or other alcohols or mixtures thereof which form droplets of the aqueous sol dispersion. However, immiscible drying media (e.g. mineral oil, silicone oil, or peanut oil), heated to a temperature of about 60° to 90°C. may also be used to dehydratively gel the mixture. The slurry forms beadlike masses in the agitated drying liquid. As the water is absorbed or driven off the beadlike masses form green composite abrasive granules. The green composite granules remain in the drying liquid until they are dehydratively gelled, i.e., as sufficient water has been removed that the granules do not adhere or stick to one another and will retain their shape.

The resulting gelled green abrasive composite granule is in a "green" or unfired gel form. The dehydrated green composite generally comprises a metal oxide or metal oxide precursor, volatile solvent, e.g. water, alcohol, or other fugitives and about 40 to 80 weight percent equivalent solids, including both matrix and abrasive, and the composites are dry in the sense that they do not adhere or stick to one another. The green particles may be further dried by heating to a temperature of about 90°– 100°C. The green granules will have a diameter up to 250 microns. The green granules will vary in size; a faster stirring of the drying liquid giving smaller granules, and vice versa.

In order to remove the balance of water, organic material or other fugitives from the green composites, they are heated in an electric furnace, kiln, or the like, in air, oxygen, or other oxidizing atmosphere, at moderately high temperatures, e.g. up to 600°C. The heating volatilizes the balance of the water, decomposes and volatilizes fugitive material present from the colloidal sol or solution, and calcines the matrix material to form a strong, continuous, porous, metal oxide matrix (that is, the matrix material is sintered). The resulting abrasive composite or granule has an essentially carbon-free continuous microporous matrix which partially surrounds, or otherwise retains or suports the abrasive grains.

This heating step may cause some shrinkage of the article, for example 10 – 20 percent or more. The shape of the article during firing remains the same, the shrinkage being uniform. The firing temperature can be 500°C. or higher, depending upon the matrix being calcined and the abrasive grain which is enclosed in the matrix. If the abrasive grain is unstable when fired in air at higher temperatures, an inert atmosphere may be used. For example, abrasive composites containing a thermally degradable abrasive, e.g. diamonds, should be fired in air at temperatures below about 600°C. to prevent oxidation of the abrasive grains.

The fired abrasive compounds will normally contain about 6 to 65 percent by volume of abrasive grains, compositions having more than 65 percent abrasive generally having insufficient matrix material to form a strong acceptable abrasive composite granule. Abrasive composite granules containing less than 6 percent abrasive grains lack enough abrasive grain for good abrasiveness. Abrasive composite granules containing about 15 to 50 percent by volume of abrasive grains are preferred since they provide a good combination of abrading efficiency with reasonable cost. This is especially true in those abrasive composites which contain the expensive abrasive particles such as cubic boron nitride or diamond.

BRIEF DESCRIPTION OF THE DRAWING

In the accompanying drawing, the single FIGURE shows an abrasive composite granule of this invention in partial section.

DESCRIPTION OF THE PREFERRED EMBODIMENTS

An example of an abrasive granule of this invention is shown in the single FIGURE. An abrasive granule 10 has a plurality of abrasive grains 11 homogeneously dispersed throughout a porous metal oxide matrix 12.

This invention is further illustrated in the following examples. All percentages are by weight unless otherwise noted. The relative percentages of abrasive and matrix in the final product are calculated from the starting materials assuming all the matrix material has been calcined to the corresponding metal oxide.

The diameter of the abrasive grains is determined by using a Coulter counter. The values given represent an average diameter for the narrow range of abrasive grains used.

Example 1

A mixture of 0.5 gram of 15-micron diamond powder, 3.3 grams of 30 percent colloidal silica dispersion in water ("Ludox LS") and 3 grams of distilled water was stirred and sonically agitated to maintain a suspension. The mixture was carefully poured into 600 ml. of agitated, stirred, 2-ethyl-1-hexanol drying solution. After about 15 seconds, 100 ml. n-butyl alcohol was added to the drying solution. Particles containing $SiO_2$ and diamond grains were formed and the stirring was continued for about 5 minutes to further dehydratively gel the particles.

The resulting green granules were filtered from the drying solution using No. 54 Whatman filter paper and dried at 95° – 100°C. for 2 hours to further extract water. The dried green granules were subsequently placed in an electric kiln in an air atmosphere, at room temperature, and the temperature raised to 500°C. over a 1-hour period.

The resulting abrasive composite granules consisted essentially of spheroidal particles ranging in size from about 20 to 200 microns in diameter, the bulk of the spheres being between 75 and 100 microns. The silica matrix was transparent, porous and colorless; dispersed discrete diamond grains were clearly visible in the matrix. The spheres contained approximately 33 percent diamond and 67 percent $SiO_2$ based on the weight of the composite.

The silica-diamond abrasive composite spheres were bonded to a plain weave two-ply 65% "Dacron" cotton cloth. A make coat of base-catalyzed phenol-formaldehyde, 50 percent solids in cellosolve and water, was applied to the cloth with a paint brush. The spheres were then dropped onto the make coat and the excess allowed to fall off. After the make coat was heated to 65° – 85°C. to precure, a size coat of the resin was applied with a brush. The coated abrasive was then heated for 10 hours at 100°C. to fully cure the resin. There were 1.5 grams of the abrasive composite granules per 150 $cm^2$. The resulting coated abrasive product was used as a disc in forming and polishing gem stones, e.g., sapphire and spinel. Compared to a conventional 15 micron resin-bonded diamond cloth, the product of this example showed a 30 – 40 percent higher rate of cut, and provided a better surface finish, upon visual examination.

Example 2

An abrasive-colloid mixture was made by mixing 3 grams of 15 micron diamond powder and 40 grams of the colloidal silica of Example 1. The resulting mixture was poured into a drying solution of 220 ml. of agitated 2-ethyl-1-hexanol. The resulting spherical droplets were dried in the alcohol for 15 minutes, filtered, and dried at 95°C. for several hours. The dried green granules were placed in an electric kiln at room temperature, and the temperature raised to 500°C. over a 1-hour period and held at 500°C. for one-half hour. The resulting spherical abrasive composite granules were screened into fractions of −30 microns, 30–45 microns, 45–60 microns, 60–105 microns and +105 microns. Microscopic examination of each fraction revealed substantially spherical abrasive composites having diamond grains dispersed in a silica matrix. The resulting abrasive composites were about 20 percent diamond and 80 percent $SiO_2$.

Example 3

Using the procedure of Example 1, 5.0 grams of 0.5 micron diamond powder was stirred with 67 grams of colloidal silica dispersion. The mixture was agitated and carefully injected through a needle into 5,000 ml. of 2-ethyl-1-hexanol and the resultant mixture of spherical green granules in liquid stirred for 15 minutes.

The green abrasive composites were retrieved by filtration, dried as in Example 1, placed in a cool electric kiln, the temperature raised in a 40 minute period to 500°C. and held at 500°C. for 20 minutes. The kiln was turned off, the abrasive granules cooled in the furnace to 300°C. over a period of 40 minutes, and the product removed and allowed to cool to room temperature. The composition of the granules was approximately 20 percent diamond and 80 percent $SiO_2$.

The abrasive granules were used to form a coated abrasive product using the procedure of Example 1. The product was used for final polishing the rough polished gem stones of Example 1. The product cut and polished extremely well for 0.5 micron diamond material.

Example 4

The procedure of Example 1 was carried out using 1.0 gram of 15-micron diamond powder and 3.3 grams of colloidal silica dispersion, the resulting mixture being poured into 600 ml. 2-ethyl-1-hexanol. After 15 seconds, 125 ml. n-butyl alcohol was added. Stirring was continued for one minute and the product filtered, dried and fired as in Example 1 to form an abrasive composite granule of 50 percent diamond and 50 percent $SiO_2$.

Under a steroscopic microscope at 70 – 140X the granules were observed to be predominantly spherical. When submerged in oil having refractive index of about 1.5, the oil's penetration into the porous matrix was observed by visual disappearance of the silica matrix. When penetration was complete only diamond grains were readily visible. The dispersion of the diamond grains throughout the granule was noted.

These granules containing a higher percentage of diamond would be especially useful for polishing ceramic materials or where a very long life abrasive is required.

Example 5

A water-dispersible $TiO_2$ gel was made by reacting 5 parts of tetraisopropyl titanate with 1 part 37 percent concentrated hydrochloric acid and air drying the resultant sol to a gel containing approximately 62.5 percent $TiO_2$. An abrasive-titania sol mixture was made by mixing 0.5 gram of 2–4 micron diamond powder, 1.6 grams of the gel, and 8 grams of water. The resulting mixture was injected into 800 ml. of 2-ethyl-1-hexanol and stirred for 5 minutes.

The resulting green abrasive granules were recovered by filtration, dried at 95°C. for several hours, placed in an electric kiln at room temperature and the temperature raised to 500°C. over a period of about 45 minutes and held at 500°C. for one-half hour.

The abrasive composite granules contained approximately one-third diamond and two-thirds $TiO_2$.

Example 6

An abrasive-colloid mixture was formed from 0.275 gram of 1 – 2.25 micron powder and 1.75 grams of $TiO_2$ gel made as in Example 5 (containing 62 percent titanium dioxide) and 10 ml. of water. The diamond-$TiO_2$ mixture was injected with a hypodermic syringe into 1200 ml. 2-ethyl-1-hexanol which was constantly agitated with a "Jiffy" stirrer at 1000 rpm. The agitation was continued for 20 minutes and the spherical green abrasive composite granules recovered by filtration were dried and fired as in Example 5.

Example 7

An alumina sol was prepared by reacting 10 parts of aluminum monohydrate ("Dispal M") with 89.2 parts water and 0.8 part of concentrated hydrochloric acid. Ten grams of the sol was mixed with 0.25 gram of 3-micron diamond powder using the procedure of Example 1. The mixture was carefully poured into 140 ml. of 2-ethyl-1-hexanol, stirred for 3 minutes, 350 ml. of n-butanol added, and stirring continued for an additional 2 minutes. The resulting spherical green abrasive composites were filtered from the mixture, dried at 95°C., placed in an electric kiln at room temperature and the temperature raised to 600°C. over a period of about 1½ hours. The end product comprised spheres containing 20 percent diamond and 80 percent $Al_2O_3$.

Example 8

A mixture was formed using 6.0 grams 3-micron diamond powder, 40 grams colloidal silica dispersion of Example 1 and 8 drops of 50 percent "Aerosol AY", (a 50% solution of sodiumdiamylsulfosuccinate in methylethylketone), the resulting mixture being dispersed using ultrasonics. The mixture was slowly poured into 2300 grams rapidly agitated 2-ethyl-1-hexanol. The resulting green abrasive composite was filtered from the solution and dried at 95°C. in air.

The green composite was placed in an electric kiln at room temperature and heated to 500°C. in a period of 40 minutes and held at 500°C. for 1 hour.

The resulting abrasive composite granules ranged in diameter from ten to 100 microns, with an average of about 50 microns. The diamond content was approximately 33 percent of the abrasive composites.

The resulting granules were mixed into a resin slurry using 15 grams of the abrasive granules, 9.9 gram of the phenolic resin of Example 1, two drops of "Advawet", a polyglycol ester, and "Cellosolve", the resulting formulation providing material which was easily brushed on.

The slurry was knife-coated onto the cloth of Example 1 at a knife setting of 3 mils. The resultant coated abrasive product was dried, the abrasive composite coating weight being about 3.1 mg/cm² of composite. The material was cured for 10 hours at 100°C. followed by a 1-inch straight flex to improve the handling characteristics of the product. The resulting material was converted to 1 inch × 42 inch (about 2.5 cm × 106 cm) endless belts using an overlap splice and techniques well known in the art.

When used for grinding and polishing tungsten carbide work pieces, the belts displayed an excellent cut rate and imparted a mirror-like finish.

Example 9

The composite abrasive granules of Examples 7 and 8 were separately screened to remove any granules over 30 micron in size forming two granule fractions. Each of the remaining two granule fractions was mixed with phenoxy urethane resin using 1.5 parts granules to 1 part adhesive. The resulting slurries were activated with "Papi" 50 (a polyarylpolyphenyl isocyanate) and thinned with methyl ethyl ketone to a cream like, coating viscosity. Each slurry was then knife coated on 3-mil (about 75 micron) polyester film at a knife setting of 2 mils (about 50 microns). This produced two films with a uniform diamond weight of 0.28 mg/cm².

The resulting coated abrasive films were used for polishing carbide workpieces, employing a standard 3-micron diamond lapping film as a control. All three films had the same weight of diamonds per square centimeter of polyester film substrate. The films of this example had a lower initial cutting rate than that of the standard film; after three minutes, however, the standard film cut rate began to decline, while the cut rate of this Example's films stayed the same. After 45 minutes the film using the granules of Example 8 had a cumulative cut 2.5 times that of the standard diamond film. A similar result was obtained with the film coated with the granules of Example 7. The abrasive composite granules provide an aggressive, long-wearing abrasive film product.

Example 10

An abrasive dispersion was made by mixing 0.9 gram 3-micron $\alpha/Al_2O_3$ abrasive grain and 6.1 grams 34 percent aqueous silica sol ("Nalco", 1034A). The mixture was poured into 400 ml. agitated 2-ethyl-1-hexanol drying solution. After stirring the dispersion and drying solution for 45 seconds, 100 ml. n-butyl alcohol was added and stirring continued for 20 minutes. The green abrasive granules were separated by filtration.

The green abrasive granules were dried at 90°C. for several hours, fired in air from room temperature to 700°C. in one hour, and held at 700°C. for one-half hour. The fired microspheres were calculated to contain 30 percent $Al_2O_3$ grain and 70 percent $SiO_2$ matrix.

The fired abrasive granules were examined under a stereoscopic microscope at 140X and ranged in size from about 20 microns to about 140 microns in diameter, averaging about 50 microns. The particles were predominantly spherical, and the abrasive $Al_2O_3$ grain could be seen as sparkling, well-dispersed particles in a colorless, transparent silica matrix.

Example 11

The procedure of Example 10 was repeated using 0.9 gram $Al_2O_3$ abrasive, 2 grams 34 percent silica sol, and 6.4 grams of aqueous zirconium acetate solution (22 percent $ZrO_2$ equivalent). The resulting fired granules were spherical and similar in appearance to those of Example 10. The composition was calculated to contain 30 percent $Al_2O_3$ and 70 percent equimolar $ZrO_2$:-$SiO_2$.

Example 12

The procedure of Example 10 was repeated using a mixture of 0.9 gram 3 micron $Al_2O_3$ (corundum) and 21 grams of alumina sol. The alumina sol was prepared by dispersing 10 grams alumina (Dispal M) in a solution of 0.6 gram concentrated $HNO_3$ and 89.4 grams $H_2O$. The mixture was dispersed in and the particles dehydratively gelled in 500 milliliters agitated 2-ethyl-1-hexanol.

The resultant green abrasive composite granules were recovered, dried, fired, and examined as in Example 10. The fired granules were predominantly spherical with a rough, textured surface caused by abrasive grains at the surface of the microspheres. The $Al_2O_3$ abrasive grains were evenly dispersed throughout. The composition of these abrasive granules was calculated to be 30 percent alumina grain and 70 percent alumina matrix.

Example 13

The procedure of Example 10 was repeated using a mixture of 0.675 gram 3-micron SiC and 15.75 grams of the $Al_2O_3$ sol of Example 12. The dehydratively gelled green composite granules were dried and fired as in Example 10.

To the unaided eye, the bulk granules appeared gray in color. Under microscopic examination, the granules were predominantly spherical and shiny crystalline silicon carbide grains were observed throughout the transparent aluminum oxide matrix. Composition of the fired abrasive composite granules was calculated at 30 percent SiC and 70 percent $Al_2O_3$.

Example 14

The procedure of Example 10 was repeated, substituting 3-micron SiC for the Al$_2$O$_3$ abrasive grains.

The green abrasive composite granules were recovered, dried, fired, and examined as described in Example 10. The fired granules were predominantly spherical, averaging about 50 microns in diameter. The appearance of the granules was similar to those of Example 13.

Example 15

The procedure of Example 10 was repeated using a mixture of 0.6 gram 15-micron cubic boron nitride and 4 grams silica sol (34 percent SiO$_2$).

The green abrasive composite granules were recovered, dried and fired as in Example 10. At 140X they were very smooth and shiny.

What is claimed is:

1. A spheroidal composite particle comprising about 6–65% by volume of fine abrasive grains which have a Knoop hardness of at least about 1500 and are on the order of 25 microns or less in effective diameter, said grains being distributed throughout about 94–35% by volume a microporous nonfused, nonvitrified, transparent, continuous metal oxide matrix having a Knoop hardness of less than 1,000, said matrix consisting essentially of at least one oxide selected from the class consisting of zirconia, silica, alumina, magnesia and titania, the diameter of the composite particle being 10–200 microns and at least twice that of the abrasive grains.

2. A spheroidal composite particle, having an effective diameter of 10–200 microns comprising about 6–65% by volume of heat-sensitive abrasive grains selected from the group consisting of diamond grains and cubic boron nitride grains and having an effective average diameter of up to 25 microns, said grains being distributed throughout about 94–35% by volume of a microporous nonfused transparent metal oxide matrix which has a Knoop hardness of less than 1,000, said matrix consisting essentially of at least one oxide selected from the class consisting of zirconia, silica, alumina, magnesia and titania.

3. A method for forming spheroidal composite particles of claim 1, comprising the steps of:
   a. dispersing abrasive grains in an aqueous sol of a metal oxide or metal oxide precursor to form a slurry, said metal consisting essentially of at least one selected from the group consisting of zirconium, silicon, aluminum, magnesium and titanium;
   b. introducing the slurry into agitated drying liquid, thereby forming spherical droplets;
   c. removing water from the droplets, thereby causing the solid material in the droplets to form spheroids;
   d. separating the spheroids from the liquid, thereby obtaining green spheroidal composite particles; and
   e. firing the green composite particles at a temperature below that required to effect fusion but sufficiently high to drive off water and fugitive materials and simultaneously calcine the metal oxide or precursor into a microporous matrix.

4. The method of claim 3, where said abrasive grains consist essentially of diamonds.

5. The method of claim 3, wherein said abrasive grains comprise cubic boron nitride.

6. The method of claim 3, wherein said sol is an alumina precursor.

7. The method of claim 3, wherein the temperature of firing is less than 600°C.

8. The method of claim 3 including the additional step of air drying the green spheroidal composite particles at about 90° – 100°C. prior to firing.

9. A coated abrasive product comprising a layer of spheroidal composite particles of claim 1 adhesively bonded to a supporting substrate.

10. The method of claim 3, wherein the metal oxide is a silica.

11. A coated abrasive product comprising a layer of spheroidal composite particles of claim 2 adhesively bonded to a supporting substrate.

12. The spheroidal composite particle of claim 2 wherein the nonfused metal oxide matrix consists essentially of silica.

13. The spheroidal composite particle of claim 2 wherein the nonfused metal oxide matrix consists essentially of alumina.

14. The coated abrasive product of claim 11 wherein the nonfused metal oxide matrix consists essentially of silica and the fine abrasive grains consist essentially of diamonds.

15. The coated abrasive product of claim 11 wherein the nonfused metal oxide matrix consists essentially of alumina.

16. The spheroidal composite particle of claim 2 wherein the abrasive grains are diamonds and the nonfused metal oxide matrix consists essentially of silica.

* * * * *